United States Patent [19]

Severson

[11] 4,161,809
[45] Jul. 24, 1979

[54] METHOD OF FABRICATING A SOLAR ABSORBER PANEL

[75] Inventor: Asbjorn M. Severson, Minneapolis, Minn.

[73] Assignee: Honeywell Inc., Minneapolis, Minn.

[21] Appl. No.: 836,804

[22] Filed: Sep. 26, 1977

[51] Int. Cl.² ............................................. B23P 15/26
[52] U.S. Cl. ................................ 29/157.3 D; 228/183; 228/221; 228/258; 165/170; 126/271
[58] Field of Search .................. 29/157.3 D, 157.3 R; 228/183, 258, 221; 165/170; 126/270, 271; 113/118 D

[56] References Cited

U.S. PATENT DOCUMENTS

| 2,137,861 | 11/1938 | Steenstrup | 113/118 D |
| 2,158,383 | 5/1939 | Saunders | 113/118 D |
| 2,232,176 | 2/1941 | Guthrie | 113/118 D |
| 2,693,636 | 11/1954 | Simpelaar | 29/157.3 D |
| 2,944,339 | 7/1960 | Sandberg | 29/157.3 D |
| 3,122,824 | 3/1964 | Tobler | 29/157.3 D |
| 3,241,607 | 3/1966 | Rutledge | 165/166 |
| 3,375,570 | 4/1968 | Dubusker et al. | 228/183 |
| 3,501,916 | 3/1970 | Butter et al. | 29/157 C |
| 3,703,758 | 11/1972 | Beck, Jr. | 29/157.3 A |
| 3,848,307 | 11/1974 | Kydd | 228/258 |
| 3,980,220 | 9/1976 | Wolfe et al. | 228/243 |
| 4,023,251 | 5/1977 | Darrow | 29/156.8 H |

FOREIGN PATENT DOCUMENTS

| 631222 | 11/1961 | Canada | 29/157.3 D |
| 566713 | 1/1945 | United Kingdom | 228/221 |
| 689414 | 3/1953 | United Kingdom | 228/136 |

Primary Examiner—C. W. Lanham
Assistant Examiner—Daniel C. Crane
Attorney, Agent, or Firm—Charles G. Mersereau

[57] ABSTRACT

A method of making a solar absorber panel is disclosed in which mild steel sheets are provided with a pattern of recesses such that when the sheets are superimposed, an internal hollow fluid heat transfer passage system is formed thereby including inlet and outlet manifolds joined by connecting passages. A metallic sealing material having a lower melting point than the sheets is placed in the recesses, the sheets are superimposed and the structure is peripherally welded to form a gas-tight envelope. The envelope is purged of air, partially internally evacuated and the edges of the internal passages sealed by heating the assembly above the melting point of the sealant material. The vacuum drawn on the envelope insures a tight seal between all passages as it allows external ambient air pressure to force the sheets together. The sealant material, which may be copper brazing rod or other material should be one which imparts a corrosion-free coated surface to the passages in addition to providing a tight seal to the unit.

6 Claims, 9 Drawing Figures

METHOD OF FABRICATING A SOLAR ABSORBER PANEL

BACKGROUND OF THE INVENTION

1. Field of the Invention

The present invention relates broadly to the field of solar energy utilization and, more particularly, to a method of vacuum-sealing the integral heat transfer passage system of a solar absorber panel which minimizes the amount of welding required yet accomplishes the advantages of a fluid-tight, corrosion resistant system.

2. Description of the Prior Art

The rapid depletion of conventional sources of energy has resulted in an ever-widening search for alternatives to conventional sources such as petroleum and natural gas to meet the increasing demand for energy by our society today. One such viable source which is presently commanding a great deal of attention and research, development and in the deployment of experimental units is that of solar energy. Solar flat plate collectors may be employed, inter alia, as sources of heat for homes and buildings and for maintaining an adequate supply of hot water in such installations.

In general, the prior art contains many examples of different ways to utilize solar energy absorbed by flat plate collectors of various types and configurations. Solar flat plate collectors normally consist of a solar absorber plate having a black body or selective absorption surface which is utilized to absorb energy from solar radiation combined with a heat transfer system which removes useful heat from the absorber plate and conducts it to a place where it is utilized or stored. Solar collector panels have been utilized to heat a variety of fluid media through heat transfer systems utilizing the solar absorber plate. The higher heat transfer coefficient of liquid media together with the higher heat capacity per unit volume exhibited by such materials as opposed to gaseous fluids results in the ability to obtain an efficient collection of the solar energy absorbed.

Of primary concern in the construction of solar collector panels is the construction of the solar absorber itself. The efficiency of the entire solar energy system depends a great deal on the efficiency of collection and transfer of heat which takes place at the solar absorber panel. Because a great deal of area is normally required to absorb sufficient solar energy to heat a building using solar flat plate collectors, the cost of each collector is of prime consideration in deploying a solar flat plate collector system. Thus a primary goal in improving the overall cost of utilizing solar energy in relation to other available sources of energy lies in a reduction of the cost of producing solar absorber panels. This includes a reduction in the cost of both materials and labor and in the production of solar absorber panels having long life and durability. While the use of such materials as mild steel which is readily available and easily fabricated, reduces material cost, it is also susceptible to oxidation corrosion. It is also desirable from a cost standpoint to reduce the amount of welding necessary to fabricate a solar absorber panel. Thus, if the internal heat transfer passages of a mild steel absorber plate can be coated with a suitable corrosion-resistant material and a great deal of the welding can be avoided in the construction of that panel, a valuable cost savings may be realized.

SUMMARY OF THE INVENTION

According to the present invention, the relatively low cost of utilizing conventional metal such as mild steel or brass as the principal material for a solar absorber panel is retained while a low cost, practical method of fabricating a corrosion-resistant solar absorber panel is provided. In the method of the present invention, two sheets of, for example, mild steel plate or both of which one are grooved, embossed or otherwise provided with recesses such that when the sheets are superimposed properly an integral internal fluid heat transfer system including inlet and outlet manifolds connected by numerous cross passages is formed. In the preferred embodiment, sealant material having a melting point lower than that of the absorber plate material is placed in the recesses and the periphery of the envelope is then sealed as by continous seam welding. Inlet and outlet accesses located on the inlet and outlet manifolds of the fluid heat transfer passage system are utilized to purge the system of air and introduce reducing of inert atmosphere to the internal structure. One of the accesses is then closed and the other attached to a vacuum system which partially evacuates the seam welded, sealed envelope in a manner which allows the ambient atmospheric pressure to press the two sheets of the envelope tightly together. The sealed, evacuated envelope is then subjected to a heating cycle which liquifies the sealant material causing it to seal all internal joints in the heat transfer passage system and also coat the internal surfaces with a corrosion-resistant material. In the preferred embodiment, oxygen-free copper braising rods are utilized for this purpose.

The vacuum brazing operation produces a tightly sealed solar absorber envelope having integral internal heat transfer passages without the necessity of continuous seam welding or spot welding along each of the many hollow fluid flow passages in the fluid heat transfer system. In addition, the use of such materials as solder or copper brazing material as the sealant coats the internal passages resulting in a greatly reduced chance of corrosion of the solar absorber panel.

BRIEF DESCRIPTION OF THE DRAWINGS

In the drawings:

FIG. 2 is an end elevational view of the sheet of FIG. 1;

FIG. 4 is a end elevational view of the sheet of FIG. 3;

DESCRIPTION OF AN ILLUSTRATIVE EMBODIMENT

Figure 1:
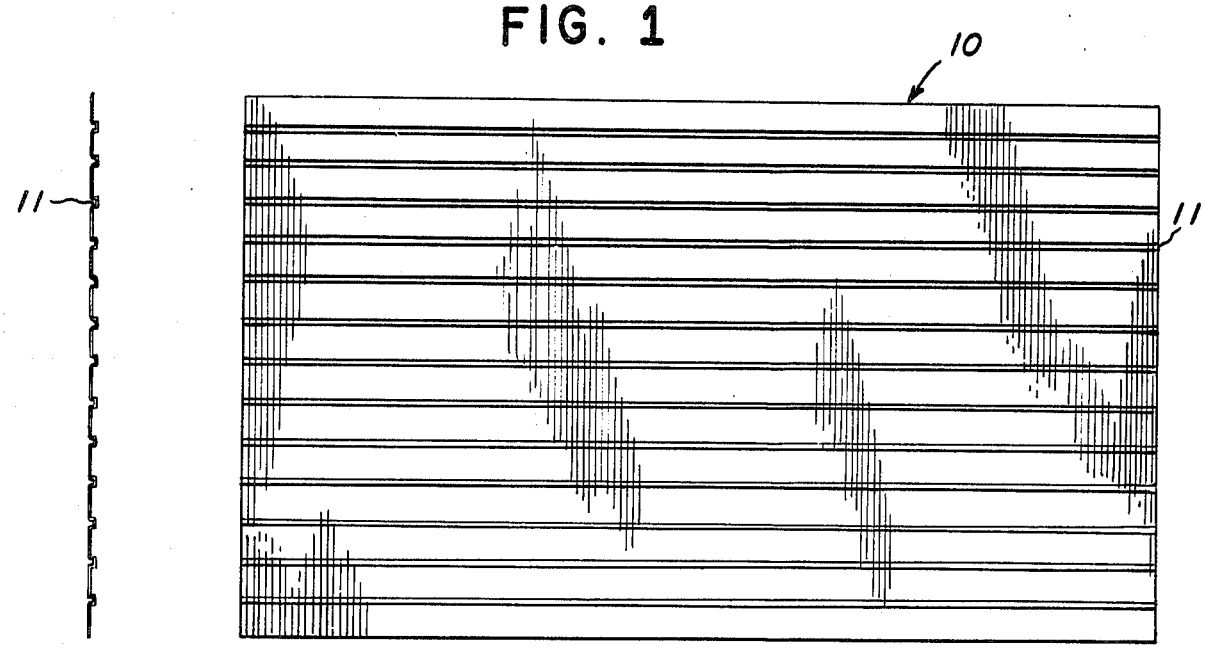
FIG. 1 is a top view of a grooved or embossed sheet containing the connecting recesses of the fluid heat transfer network system of the invention.
Figure 3:
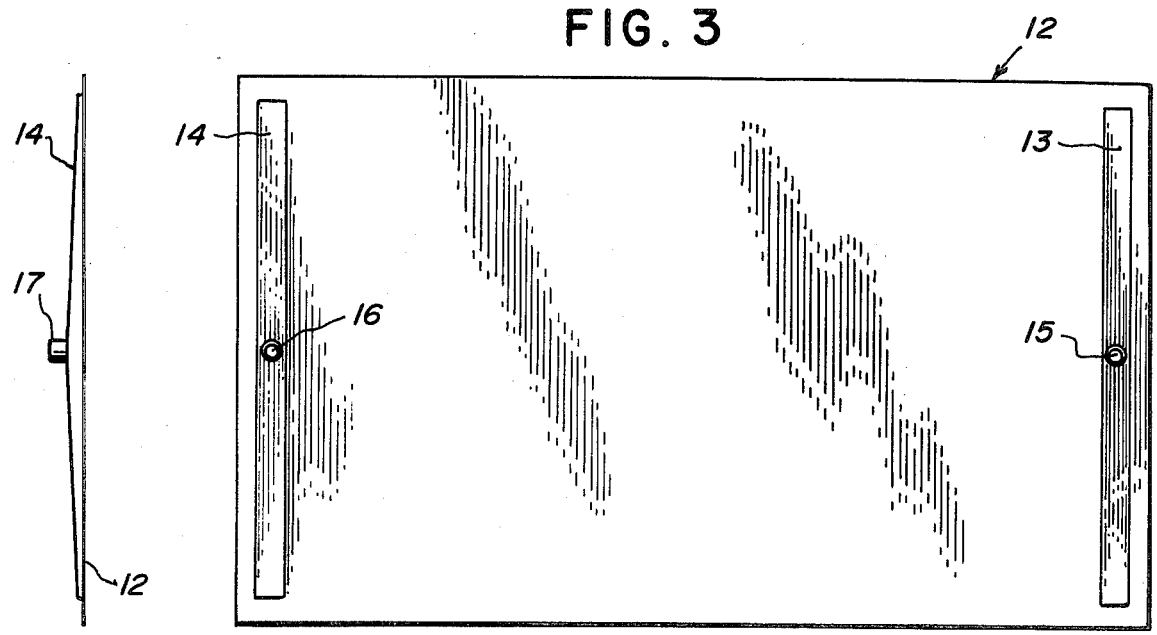
FIG. 3 is a top view of a companion sheet containing recesses for the inlet and outlet manifolds.
Figure 5:
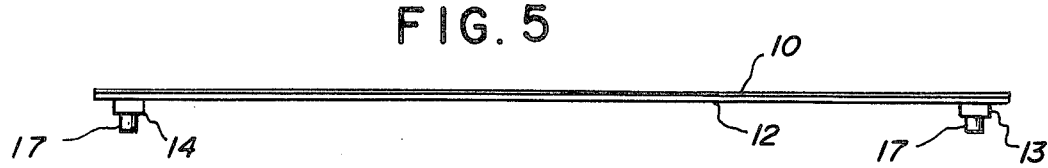
FIG. 5 is a side elevational view of the sheet of FIG. 3.

In FIGS. 1-4 there is depicted oppositely disposed recessed or grooved sheets which make up the absorber panel and integral fluid heat transfer passage system of one embodiment of the invention. The first or upper sheet depicted at 10 in FIG. 1 consists of a mild steel sheet suitably formed with grooves or recesses to form an array of juxtaposed elongated indentations 11 across the sheet 10. These can be produced as by stamping, drawing or other conventional shaping means. The ribbed or grooved structure is further illustrated in FIG. 2. FIG. 3 depicts the second or lower sheet of the structure having larger integral recessed portions or grooves 13 and 14 corresponding to inlet and outlet manifolds. As illustrated in FIGS. 4 and 5, inlet and outlet openings 15 and 16 are provided with access 17 welded coupings, nipples or other conventional pipe fittings to be ultimately connected to a larger solar flat plate collector system.

Figure 6:
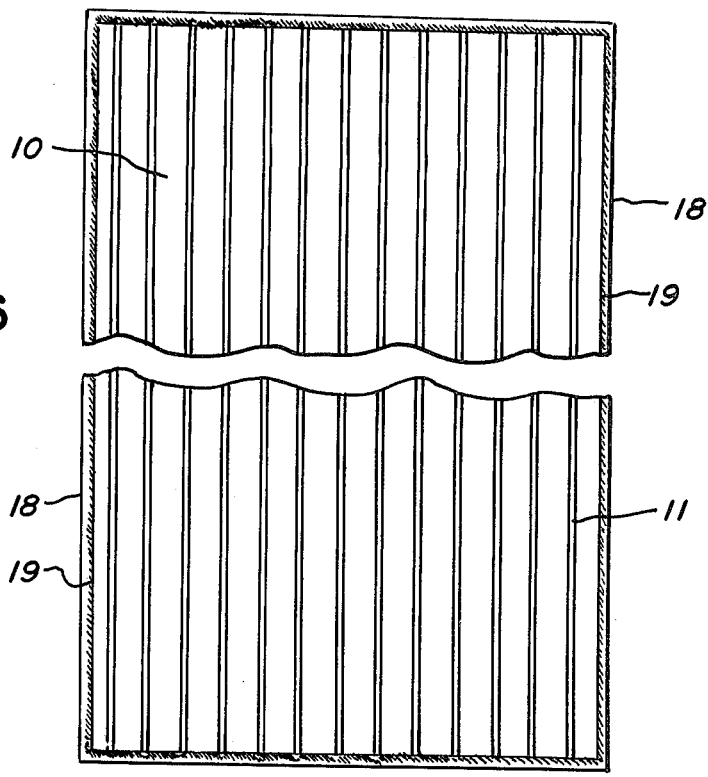
FIG. 6 is the top view of the combined panels of FIGS. 1 and 3 peripherally welded to form the envelope.

FIG. 5 depicts the sheet 10 superimposed on sheet 12 such that the grooves 11 connect inlet and outlet grooves 13 and 14. The superimposed sheets are peripherally seam welded as shown at 18 in FIG. 6 to produce a gas-tight envelope 19 accessible only through the inlet and outlet connections 17 (FIG. 6). This may be accomplished using a welding wheel which flattens the ends of the grooves 11 as it seals the periphery.

Figure 7:
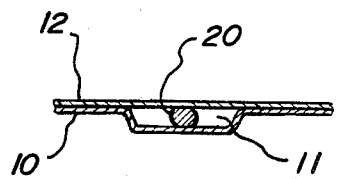
FIG. 7 is an enlarged sectional view of one of the internal passages of FIG. 6 having a sealant material therein.
Figure 8:
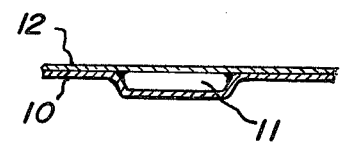
FIG. 8 shows the passage of FIG. 7 after the heat treatment operation.

Prior to the assembly of the sheets 10 and 12 the metal surfaces are thoroughly cleaned and a suitably selected sealant material such as oxygen-free copper brazing rods are placed in each of the grooves to accomplish subsequent internal sealing between all internal passages of the envelope forming the solar absorber panel of the invention. Thus, FIG. 7, depicts a typical internal groove passage 11 formed between the mild steel sheets 10 and 12 and containing a rod of sealant material 20.

Figure 9:
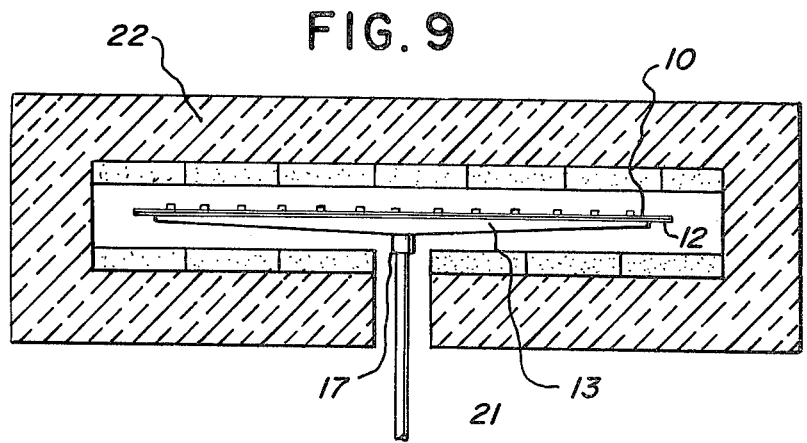
FIG. 9 depicts a cross section of a heat treating furnace including the envelope of the invention.

The peripherally seam welded envelope is then purged of air by connecting one of the connectors 17 to a source of a non-oxidizing gas such as hydrogen or methane and purging the envelope with several volume changes of that gas. One of the connectors 17 is then sealed as by plugging or capping and the other access connector attached as shown in FIG. 9 to a vacuum pump as through a connector 21. A continous partial vacuum is drawn on the envelope thereby maintaining a nonoxidizing gas in the envelope during the heating cycle as depicted in a continuous furnace 22. As the envelope 18 is evacuated the external air pressure forces the sheets 10 and 12 together while the sealant material 19 is liquified and flows by capillary action into all the junctures between the two sheets both sealing the sheets together between the grooves and isolating each of the formed hollow fluid heat transfer passages of the lattice network. In addition, the sealant material imparts a coating thereof to the mild steel internal passages to aid in the prevention of corrosion in the fluid heat transfer system.

Upon cooling, the assembled system is removed from the vacuum pump and a strong, internally corrosion-resistant system has been prepared. The upper surface of the sheet 10 may then be suitably treated or coated to provide an excellent solar absorbing surface.

It should be noted that the method of fabricating the solar absorber panel of the present invention eliminates costly and time-consuming seam welding between each of the lateral or connecting grooves to produce the desired fluid flow passage configuration for proper heat transfer in the system. In addition, it provides the added strength between the sheets without the necessity of additional welding.

Of course, alternate embodiments such as one wherein all the grooves are in a single sheet are also contemplated as are other sealant materials such as high temperature solders. In addition, other principal structural materials such as thin gauge brass may be used.

I claim:

1. A method of fabricating a solar flat plate absorber panel comprising the steps of:

providing a pair of sheets of structural metal including a first sheet having a plurality of juxtaposed elongated grooves formed therein and a second sheet provided with a pair of substantially parallel grooves across the end portions thereof and having openings therein for the provision of inlet and outlet accesses thereto such that when the pair of sheets is assembled in a superimposed fashion the grooves form a distinct fluid passage system consisting of manifold passages joined by a plurality of connecting passages;

placing suitable metallic sealant material in the grooves of said sheets, said sealing material having a melting point lower than that of the sheets;

assembling said pair of sheets in superimposed configuration to create said fluid passage system and seam welding the periphery of said assembled pair of sheets to produce a fluid tight envelope having a hollow internal passage network;

purging said internal passage system of air by flowing a non-oxidizing gas therethrough; and partially evacuating said internal volume of said envelope while heating said envelope thereby maintaining said non-oxidizing gas therein at reduced pressure in a manner which causes said sealant to melt and fill the peripheral junctures of said passages.

2. The solar flat plate absorber panel of claim 1 wherein said structural metal is mild steel.

3. The solar flat plate absorber panel of claim 1 wherein said structural metal is brass.

4. The solar flat plate absorber panel of claim 1 wherein all of said grooves are formed in one of said sheets.

5. The solar flat plate absorber of claim 1 wherein said sealant material is copper.

6. The solar flat plate absorber of claim 1 wherein said sealant material is solder.

* * * * *